United States Patent
Hadano

(10) Patent No.: US 8,693,030 B2
(45) Date of Patent: Apr. 8, 2014

(54) MANAGEMENT APPARATUS AND METHOD FOR ANALYZING AN ABNORMALITY OF A STATE OF AN IMAGE FORMING APPARATUS

(75) Inventor: Masahiro Hadano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/758,543

(22) Filed: Apr. 12, 2010

(65) Prior Publication Data
US 2010/0259789 A1    Oct. 14, 2010

(30) Foreign Application Priority Data

Apr. 14, 2009   (JP) .................................. 2009-098146

(51) Int. Cl.
*G06F 3/12* (2006.01)
(52) U.S. Cl.
USPC ......................... 358/1.15; 358/1.13; 358/1.14
(58) Field of Classification Search
USPC ....................... 358/1.15, 1.13, 1.14
See application file for complete search history.

(56) References Cited

U.S. PATENT DOCUMENTS

| | | | | |
|---|---|---|---|---|
| 5,913,090 A | * | 6/1999 | Sawada et al. | 399/8 |
| 6,141,507 A | * | 10/2000 | Sawada | 399/8 |
| 2005/0275868 A1 | * | 12/2005 | Higashiura et al. | 358/1.14 |
| 2008/0239344 A1 | * | 10/2008 | Wang et al. | 358/1.9 |

FOREIGN PATENT DOCUMENTS

| | | |
|---|---|---|
| JP | 9-321931 A | 12/1997 |
| JP | 2007-152771 A | 6/2007 |

* cited by examiner

*Primary Examiner* — Jacky X Zheng
(74) *Attorney, Agent, or Firm* — Canon USA, Inc. IP Division

(57) ABSTRACT

A management apparatus which manages a printing apparatus calculate the number of confirmation sheets printed out for confirmation printing from the number of sheets to be printed which is based on a print request and an actual performance number of sheets printed out based on history information of a job corresponding to the print request from the printing apparatus, and analyzes an abnormality of the printing apparatus when it is analyzed that a job whose number of printed confirmation sheets exceeds a predetermined reference value frequently occur.

20 Claims, 11 Drawing Sheets

FIG. 4

ACTUAL PERFORMANCE OF PRINTING APPARATUS — 301

PRINTING APPARATUS ID: device1 — 302

| PRINT JOB ID | NUMBER OF PRINTED SHEETS | NUMBER OF PRINT CONFIRMATION SHEETS | NUMBER OF SHEETS TO BE PRINTED |
|---|---|---|---|
| 1 | 3193 | 193 | 3000 |
| 2 | 6282 | 282 | 6000 |
| 3 | 5120 | 120 | 5000 |

| NUMBER OF SHEETS TO BE PRINTED | NUMBER OF PRINT CONFIRMATION SHEETS (REFERENCE VALUE) |
|---|---|
| 1000 | 100 |
| 2000 | 100 |
| 3000 | 200 |
| . | . |
| . | . |
| ≥ 10000 | 300 |

DEFINE REFERENCE VALUES OF THE NUMBER OF PRINT CONFIRMATION SHEETS CORRESPONDING TO THE NUMBER OF SHEETS TO BE PRINTED

EDIT  COMPLETE EDIT  ADD LINE

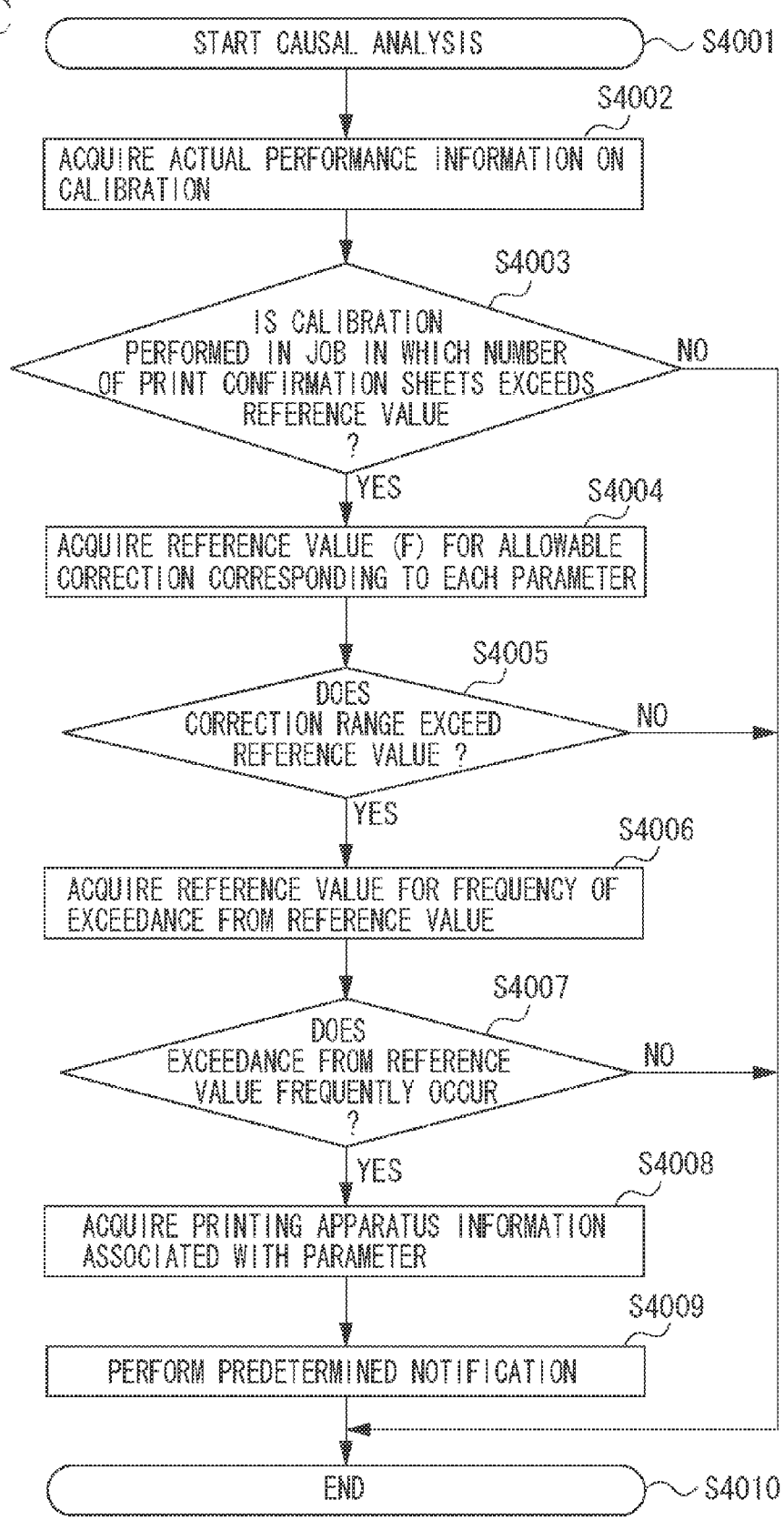

FIG. 8

THERE IS CONTINUING TREND THAT PRINT AMOUNT IS LARGE FOR
PERFORMANCE DEFINED BY SPECS OF PRINTING APPARATUS.
CONSEQUENTLY, FREQUENCY OF COMPONENT REPLACEMENT INCREASES.
THE NUMBER OF PRINT CONFIRMATION SHEETS INCREASES.
TO REDUCE PRINTING COST, IT IS RECOMMENDED TO PERFORM
DISTRIBUTED PRINTING USING OTHER PRINTERS YOU HAVE.

LIST OF OTHER PRINTING APPARATUSES
(IN ORDER OF RECOMMENDATION)
1.   PRINTING APPARATUS 3
2.   PRINTING APPARATUS 2

RETURN

MANAGEMENT APPARATUS AND METHOD FOR ANALYZING AN ABNORMALITY OF A STATE OF AN IMAGE FORMING APPARATUS

BACKGROUND OF THE INVENTION

1. Field of the Invention

The present invention relates to a technique for managing a state of an image forming apparatus and for analyzing an abnormality of the state thereof.

2. Description of the Related Art

A management system has been known, in which a management apparatus remotely monitors a state of an image forming apparatus such as a printing apparatus or a multi-function peripheral (MFP). In this management system, the management apparatus arranges for a serviceperson who performs maintenance work of an image forming apparatus.

Japanese Patent Application Laid-Open No. 09-321931 discusses a management system in which a printing apparatus detects occurrence of a jam and transmits an alarm and a counter value at that time to a management apparatus. When the management apparatus receives the alarms, the number of which is equal to or more than a reference number, against occurrence of the jam while a preset number of sheets are printed, the management apparatus deems that possibility of a reoccurrence of a jam is high, and that it is necessary to arrange for a serviceperson.

However, the above management method is not suitable for commercial printing that involves delivering printed materials to a customer until a designated deadline. The reason is that when maintenance work is performed by arranging for a serviceperson after the management apparatus detects a malfunction of the printing apparatus, a downtime of the printing apparatus is long, so that a missing of a delivery deadline can occur. Thus, in commercial printing, sometimes, a management system is adopted in which an operator is deployed at a printing site to perform the maintenance work on site. In this case, sometimes, the management apparatus which detects a malfunction of the printing apparatus notifies the operator of an abnormality of the printing apparatus.

Further, High-quality printing is demanded in commercial printing. Accordingly, an operator at a printing site performs printing for confirmation, such as "adjustment of hue to a customer's favorite" and "adjustment of a printing position", and confirmation printing such as continuous test printing for "causing the printing apparatus to stably operate". In commercial printing, naturally, sheets, the number of which is larger than a number of sheets ordered by a customer, is printed due to such confirmation printing in addition to failed printing caused by a device error. In a printing company which performs commercial printing, it is demanded from a cost viewpoint to minimize the number of printouts generated by the confirmation printing and the test printing.

Japanese Patent Application Laid-Open No. 2007-152771 discusses, as a technique for managing the number of printouts other than normal ones, a technique for determining waste sheet occurrence conditions that define occurrence factors of waste sheets generated due to failed printing, for counting the number of printouts while the waste sheet occurrence conditions are satisfied, and for measuring the number of waste sheets corresponding to each of the waste sheet occurrence conditions.

However, the above related arts have the following problems. For example, Japanese Patent Application Laid-Open No. 09-321931 discusses a method for analyzing a malfunction occurring in a printing apparatus, but in the method, a relation of events triggering analyses to analysis processes is limited to a predetermined one-to-one corresponding relation. In other words, Japanese Patent Application Laid-Open No. 09-321931 discusses a method that performs only derivation of a dealing process corresponding to alarm information of the malfunction. Thus, this method neither extracts a foretaste of various abnormalities and malfunctions occurring in the printing apparatus nor performs causal analysis of the abnormalities and the malfunctions.

The related art according to Japanese Patent Application Laid-Open No. 2007-152771 can derive waste sheets generated due to a predetermined factor. However, this related art cannot derive a foretaste of a malfunction of the printing apparatus or analyze a cause of the malfunction. In commercial printing, a certain amount of confirmation printing occurs inevitably. On the other hand, sometimes, due to an abnormality of the printing apparatus, the number of printouts is larger than a normal value. However, malfunctions and abnormalities of the printing apparatus are not always detected as preliminarily defined events. Accordingly, a structure for flexibly detecting malfunctions and abnormalities of the printing apparatus is required.

SUMMARY OF THE INVENTION

According to an aspect of the present invention, a management apparatus which manages a printing apparatus includes an acquisition unit configured to acquire a number of sheets to be printed which is based on a print request, and an actual performance number of sheets printed out based on history information of a job corresponding to the print request from the printing apparatus, a calculation unit configured to calculate the number of confirmation sheets by subtracting the acquired number of sheets to be printed from the actual performance number, a first analyzing unit configured to analyze, corresponding to each of a plurality of jobs processed by the printing apparatus, whether the number of printed confirmation sheets exceeds a first threshold, a second analyzing unit configured to analyze that the job, which is analyzed that the number of printed confirmation sheets exceeds the first threshold, frequently occurs when the number of job exceeds a second threshold in a preset time, and a third analyzing unit configured to analyze an abnormality of the printing apparatus when the second analyzing unit analyzes that the job frequently occur.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of display of a result of calculating the number of printed confirmation sheets.

FIG. 5 illustrates an example of a Web screen for setting a reference value corresponding to each number of sheets to be printed.

FIGS. 7A through 7D are flowcharts respectively illustrating examples of analysis processing, by the management apparatus, causes of the frequent occurrence of the exceedance of the reference value of the number of printed confirmation sheets.

FIG. 8 illustrates an example of display of a notification of an analysis result received from the management apparatus.

DESCRIPTION OF THE EMBODIMENTS

Various exemplary embodiments, features, and aspects of the invention will be described in detail below with reference to the drawings.

Figure 1:
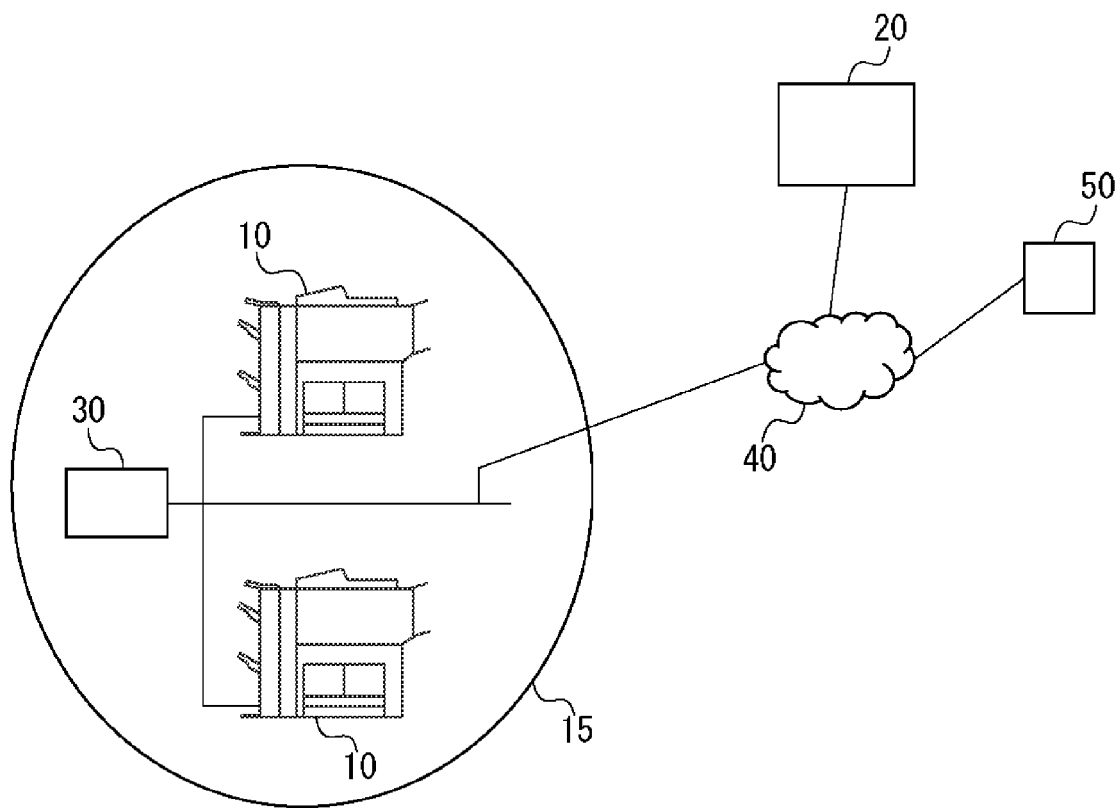
FIG. 1 illustrates a management system according to an exemplary embodiment of the present invention.

FIG. 1 illustrates an example of a management system for managing an image forming apparatus to which the present invention is applied. As illustrated in FIG. 1, a printing apparatus 10 serving as an image forming apparatus is connected to a management apparatus 20 via a network 40 such as the Internet. A portable terminal 50 used by an operator or the like, who performs maintenance of the printing apparatus 10, is connected to the network 40. The image forming apparatus can be an MFP which has a plurality of functions including a scanner function.

A plurality of printing apparatuses 10 can be present in environment of a local area network (LAN) 15. The environment of the LAN 15 includes a client apparatus 30 capable of transmitting a print job to the printing apparatus 10. In the commercial printing industry, sometimes, the client apparatus 30 functions as a management information system (MIS). The MIS performs operations of managing contents of requests and data received from a customer and transmitting data representing a print job to the printing apparatus 10. The MIS also performs management of actual performance regarding the received request.

When a print job from the client apparatus 30 is received, the printing apparatus 10 temporarily stores the print job. The printing apparatus 10 can be controlled so as to start printing in response to reception of a print start instruction after various operations are performed by an operator. The operations performed by the operator are, e.g., adjustment of an image output format, and various types of setting of the printing apparatus 10. The printing apparatus 10 can store data representing the number of printouts, status information including its own errors, and history information corresponding to processing such as jobs. The printing apparatus 10 notifies an external device, e.g., the management apparatus 20, of such information. The notification of information to the management apparatus 20 can be performed by installing a site monitoring terminal (not shown) serving as a repeating device in the LAN 15 and performing communication control according to a desired schedule.

The management apparatus 20 accumulates and manages the data representing the number of printouts, the status information, the history information, and the like collected from the printing apparatus 10. In addition, the management apparatus 20 determines whether an abnormality occurs, while detecting malfunctions based on the information notified from the printing apparatus 10. When it is determined that maintenance is necessary based on a result of the determination, the management apparatus 20 informs the operator of necessity of the maintenance. In this case, it is assumed that the management apparatus 20 informs the operator's portable terminal by e-mail or the like that maintenance is necessary. When the management apparatus 10 notifies an operator working on a printing site of the determination, the printing apparatus 10 can be designated as a notification destination.

Figure 2A:
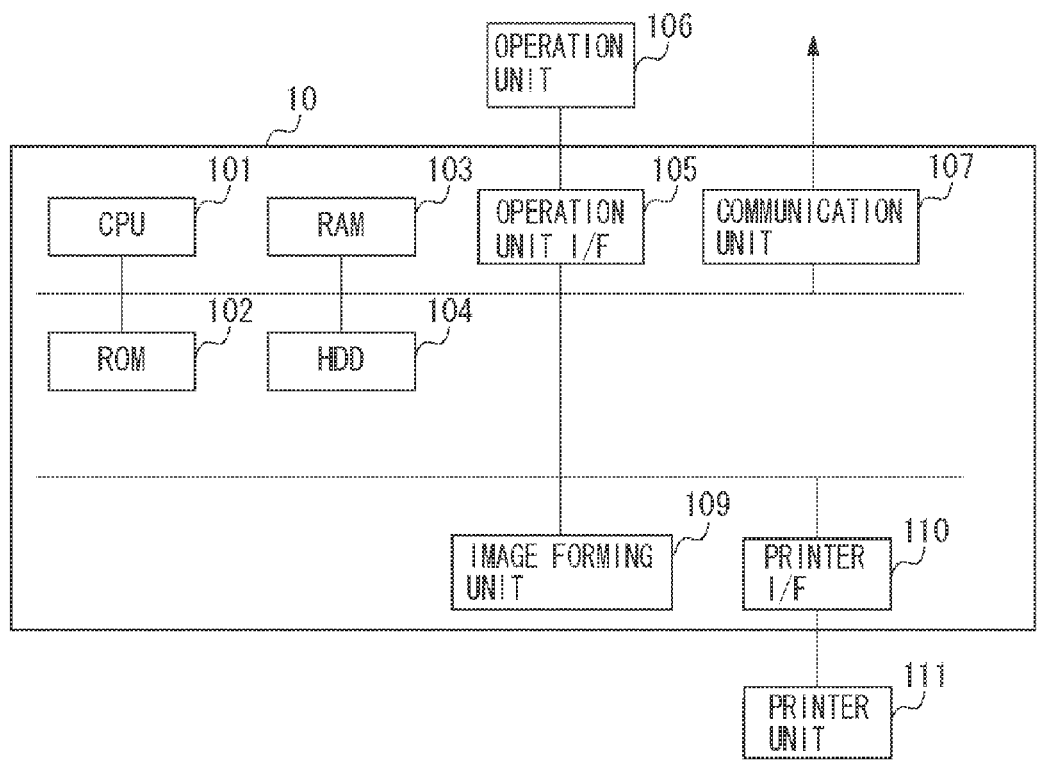
FIGS. 2A and 2B illustrate a configuration of a printing apparatus illustrated in FIG. 1.
Figure 2B:
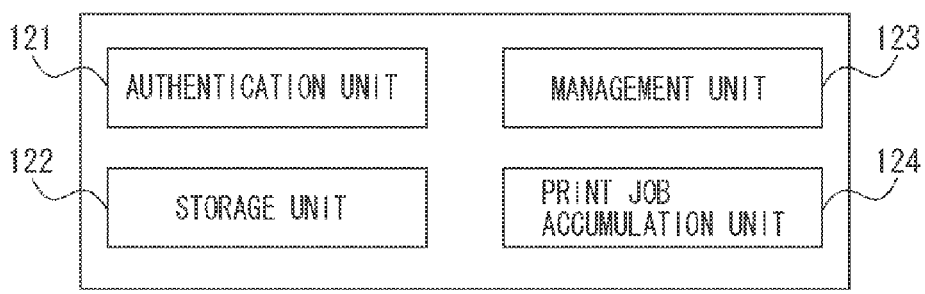

FIGS. 2A and 2B illustrate a configuration of the printing apparatus 10.

The printing apparatus 10 includes a printer unit 111 serving as an image output device, a controller (central processing unit (CPU)) 101 which comprehensively controls an operation of the entire printing apparatus 10.

The CPU 101 comprehensively controls, based on control programs stored in a read-only memory (ROM) 102, an access to each of various devices that are connected thereto. In addition, the CPU 101 comprehensively controls various types of processing performed in the controller. The ROM 102 stores a boot program for the apparatus, and the like. A random-access memory (RAM) 103 serves as both of a system work memory for causing the CPU 101 to operate, and a memory for temporarily storing image data. The RAM 103 includes a static random access memory (SRAM) capable of storing data even after power is turned off, and a dynamic random access memory (DRAM) from which stored data is deleted after power is turned off. A hard disk drive (HDD) 104 can store system software and image data. The HDD 104 stores information which is managed by and recorded in a storage unit 122 and a printing job storage unit 124, which are described below.

An operation unit interface (I/F) 105 is an interface unit for connecting a system bus to an operation unit 106. The operation unit 106 is an interface for enabling an operator to perform various types of setting, and operations, such as a print instruction, on the printing apparatus 10. The operation unit 106 is provided with a panel for displaying information. A communication unit 107 is connected to a communication line such as an external network, and performs input/output of information. An image forming unit 109 performs direction change, compression/expansion of image data. The image forming unit 109 has a function of interpreting a page description language (PDL). The image forming unit 109 receives a job such as PDL data instructed by the client apparatus 30 that is connected to the LAN 15, and converts the received job into image data, e.g., bitmap data.

A printer I/F 110 receives image data transmitted from the image forming unit 109 and performs image formation on the image data while referring to attribute data associated with the image data. The image data subjected to the image forming is output to the printer unit 111. The printer unit 111 forms an image represented by the received image data on a sheet of paper. According to the present exemplary embodiment, an image forming method is an electrophotographic method using a photosensitive drum or a photosensitive belt. The image forming method according to the present invention is not limited thereto. For example, an inkjet method for printing characters on a sheet by discharging ink from a micronozzle array can be applied.

Information about the printing apparatus 10 can be provided to an operator via, e.g., the operation unit 106. Alternatively, the information about the printing apparatus 10 can be provided to an operator via the client apparatus 30 connected thereto via the LAN 15. The printing apparatus 10 can include a scanning function and the like.

An authentication unit 121 controls authentication processing for checking, when an operator starts an operation at the printing apparatus 10, whether the operator has an operation authority.

A management unit 123 performs, when printing a print job, measurement of the number of printouts, and generation and management of a history relating to printing processing. In addition, the management unit 123 records, in the storage unit 122, status information, such as a malfunction, detected by the printing apparatus 10. The management unit 123 also controls notification of the status information to the management apparatus 20 via the communication unit 107. A print job accumulation unit 124 temporarily stores a print job received from the client apparatus 30. The management unit 123 performs processing that reflects accumulation of print jobs and settings based on an operator's operation.

In the storage unit 122, data including the number of printouts measured at the output of prints, history information relating to printing processing, and status information about the printing apparatus 10. In addition, information about an operator who logs on, history information about operations performed by the operator, a history of replacement of components of the printing apparatus 10, a jam history, and history information about correction at calibration are recorded in the storage unit 122. Further, identification information for uniquely identifying the printing apparatus 10 and external devices, such as the management apparatus 20, network information such as an address of the apparatus, information about various settings and functions of the printing apparatus 10, and authentication information are recorded in the storage unit 122.

Figure 3A:
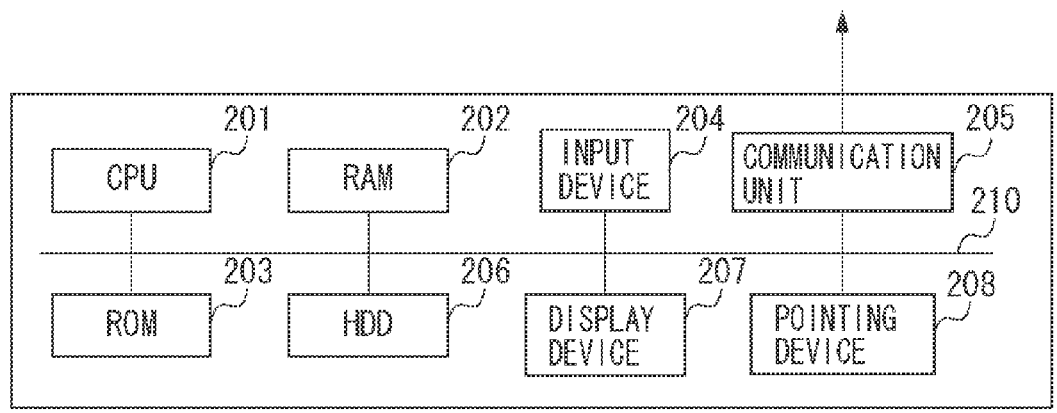
FIGS. 3A and 3B illustrate a configuration of a management apparatus illustrated in FIG. 1.
Figure 3B:
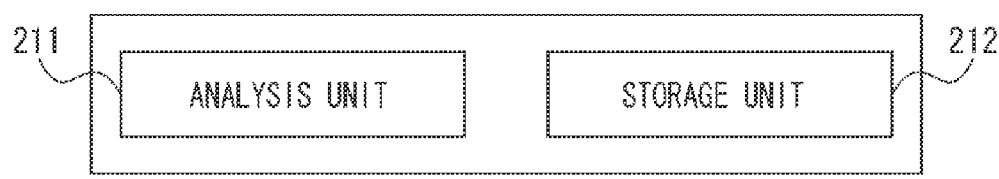

FIGS. 3A and 3B illustrate a configuration of the management apparatus 20.

FIG. 3A is a block diagram illustrating a hardware configuration of the management apparatus 20 illustrated in FIG. 1. FIG. 3A illustrates a configuration of a general personal computer. As illustrated in FIG. 3A, a CPU 201, a RAM 202, a ROM 203, an input unit 204 such as a keyboard, a communication unit 205, and a HDD 206 are connected communicably with one another via a system bus 210. In addition, a display unit 207, such as a cathode ray tube (CRT), and a pointing device 208 such as a mouse are connected via the system bus 210 communicably with each other.

Control programs are preliminarily stored in the ROM 203 or the HDD 206. The CPU 201 reads the control program from the ROM 203 or the HDD 206 to the RAM 202 and executes the read control program. Thus, the CPU 201 fulfills a function of a computer. When the CPU 201 executes the programs, processing characteristic to the present invention to be executed mainly by software modules which will be described below is implemented.

The CPU 201 displays various types of information via the display unit 207 and receives a user's instruction and the like input from the input unit 204 and the pointing device 208. In addition, the communication unit 205 performs communication control for transmitting and receiving various types of information to and from the printing apparatus 10 and the portable terminal 50.

FIG. 3B illustrates a configuration of software modules of the management apparatus 20 illustrated in FIG. 1.

Various types of information (e.g., environmental information, customer information, identification information, and the like) necessary for management of the printing apparatus and for communication with devices provided on the network and information received from the printing apparatus 10 are recorded in the storage unit 212. More specifically, the number of printouts, various types of history information, and status information about malfunctions which are received from the printing apparatus 10 are stored in the storage unit 212. Further, reference values needed for analysis by an analysis unit 211 and analysis results are recorded in the storage unit 212. In addition, messages for requesting maintenance, various types of support information, and formats are stored in the storage unit 212. When a Web screen is provided to notify information, access management information for accessing to the Web screen is also recorded in the storage unit 212.

The analysis unit 211 analyzes the number of printed sheets used in the printing apparatus 10 for confirmation printing including test printing. More specifically, the analysis unit 211 calculates the number of printed confirmation sheets in the number of printed sheets which is collected from the printing apparatus 10. In addition, the analysis unit 211 determines whether the number of printed confirmation sheets exceeds a reference value. When the number of printed confirmation sheets exceeds the reference value, the analysis unit 211 further determines whether exceedance of the number of printed confirmation sheets from the reference value frequently occurs. When it is determined that the exceedance of the number of printed confirmation sheets from the reference value frequently occurs, the analysis unit 211 analyzes an abnormality of the printing apparatus 10 using history information concerning the printing apparatus 10 which is stored in the storage unit 212. A result of analysis performed by the analysis unit 211 is recorded in the storage unit 212.

According to the present invention, the management apparatus 20 notifies a predetermined destination of an abnormality caused in the printing apparatus 10 and support information for coping with the abnormality, utilizing the result of analysis performed by the analysis unit 211. Thus, the management apparatus 20 performs the following process.

Step 1. The management apparatus 20 calculates the number of printed confirmation sheets corresponding to each print job.

Step 2. The management apparatus 20 determines whether the number of printed confirmation sheets exceeds the reference value.

Step 3. The management apparatus 20 determines whether the exceedance of the number of printed confirmation sheets from the reference value frequently occurs.

Step 4. When the exceedance of the number of printed confirmation sheets from the reference value frequently occurs, the management apparatus 20 analyzes an abnormality using the status information and the history information of the printing apparatus 10.

Step 5. The management apparatus 20 notifies a predetermined destination of a result of analysis.

In order to implement the above described step 1, the management apparatus 20 collects, from the printing apparatus 10, the number of sheets printed in each print job. A collecting method can be implemented, such that the printing apparatus 10 transmits to the management apparatus 20, at a predetermined timing, an actual performance number of sheets actually printed in each print job which is accumulated in the printing apparatus 10. Alternatively, the management apparatus 20 can request the printing apparatus 10 to transmit the actual performance number of sheets printed in each print job. The actual performance number of printed sheets can be derived from, e.g., the history information corresponding to each print job.

The information transmitted from the printing apparatus 10 to the management apparatus 20 includes not only the actual performance number of sheets printed in each print job but a number of sheets to be printed which is originally specified in the print job. The number of sheets to be printed is included in contents of a print request received from a customer. In addition, identification information for identifying the printing apparatus 10 as a transmission source and a print job is also included in the contents of the print request.

The management apparatus 20 calculates the number of sheets printed excessively due to confirmation and failure as the number of printed confirmation sheets, utilizing information received from the printing apparatus 10. In this case, the number of printed confirmation sheets is calculated by subtracting the number of sheets to be printed from the actual performance number of sheets printed corresponding to each print job.

FIG. 4 illustrates an example of display of a result of calculating the number of printed confirmation sheets. The management apparatus 20 generates a Web screen for an administrator and an operator of the printing apparatus 10 to confirm the number of printed confirmation sheets. Access management information for managing access to the Web screen is managed by the storage unit 212.

Printing apparatus identification (ID) 302 is identification information of the printing apparatus 10. Print job ID 303 is identification information of a print job processed by the printing apparatus 10. The number of printed sheets 304 represents the (actual performance) number of sheets actually output by the printing apparatus 10 based on a print job. The number of printed confirmation sheets 305 is calculated by subtracting the number of sheets to be printed 306 from the number of printed sheets 304. The number of sheets to be printed 306 corresponds to the number of sheets printed based on a request received from a customer. Information representing the number of sheets to be printed 306 is notified utilizing a print job (e.g., a job ticket) from the client apparatus 30 to the printing apparatus 10.

In the above described step 2, the management apparatus 20 determines whether the number of printed confirmation sheets exceeds the reference value. The reference value is a criterion value determined by an administrator or an operator of a printing company or a target value provided by a manufacturer of printing apparatuses. Alternatively, an average value of the numbers of actually printed confirmation sheets which are calculated from apparatuses that are the same in performance defined by specifications in an environment (LAN 15) of a printing company, can be used as the reference value. Furthermore, the management apparatus 20 can provide, as an index, an average value of the numbers of actually printed confirmation sheets which are calculated from apparatuses of the same model used by printing companies including those similar in installation environment, received order amount, and print contents to the printing company using the printing apparatus 10, or by users including those other than a user of the printing apparatus 10. The management apparatus 20 can determine the reference value so as to correspond to the number of sheets to be printed. The reference values are managed by the storage unit 212.

FIG. 5 illustrates an example of a Web screen for setting a reference value corresponding to each number of sheets to be printed. The managed apparatus 20 provides a Web screen 401 illustrated in FIG. 5 to an administrator and an operator of a printing company, such that the administrator or the operator can set, as the reference value, the number of printed confirmation sheets corresponding to each number of sheets to be printed according to circumstances of the printing company.

A reference value setting unit 402 is an interface for designating the number of printed confirmation sheets which serves as the reference value for each number of sheets to be printed. The operator can designate the number of printed confirmation sheets which corresponds to each number of sheets to be printed using a predetermined input unit such as a radio button. The Web screen 401 has a function of entering an edit mode by pressing an "edit" button 403 in which the number of printed confirmation sheets serving as the reference value can be edited. The Web screen 401 has a "complete edit" button 404 for completing designation of the number of printed confirmation sheets and registering the designated number of printed confirmation sheets in the storage unit 212. Further, the Web screen 401 has an "add line" button 405 for enabling an administrator of a printing company to add new reference value information. Thus, the number of sheets to be printed, and the number of printed confirmation sheets serving as the reference value can be registered.

In the above described step 3, the management apparatus 20 determines whether exceedance of the number of printed confirmation sheets from the reference value frequently occurs. If it is determined that the exceedance of the number of printed confirmation sheets from the reference value highly frequently occurs, it is considered that some abnormality occurs in the printing apparatus 10 whose abnormality is not notified to the management apparatus 20, with high probability. The abnormality is an event that cannot be detected directly by a sensor (not shown) provided in the printing apparatus 10. The abnormality includes a foretaste of failures, which can be detected by the sensor, and malfunctions of the apparatus itself due to installation environment. A result of determination in the step 3 is used for analysis in the above described step 4.

Information serving as a criterion for determining frequency of the exceedance of the number of printed confirmation sheets from the reference value is managed by the storage unit 212 of the management apparatus 20. More specifically, e.g., when the number of occurrences of the exceedance from the reference value in a predetermined number of print jobs reaches a predetermined number (i.e., a rate of occurrence of the exceedance is high), or when the number of occurrences of the exceedance from the reference value reaches a predetermined number in a predetermined time period, it is determined that the exceedance of the number of printed confirmation sheets from the reference value frequently occurs. The predetermined number of print jobs, the predetermined time period, and the predetermined number of times can be optionally and preliminarily set based on an empirical rule by an administrator of the management apparatus 20 by performing analysis using, e.g., history information about malfunctions of similar printing apparatuses actually operated in the past and various types of accumulated information.

Figure 6:
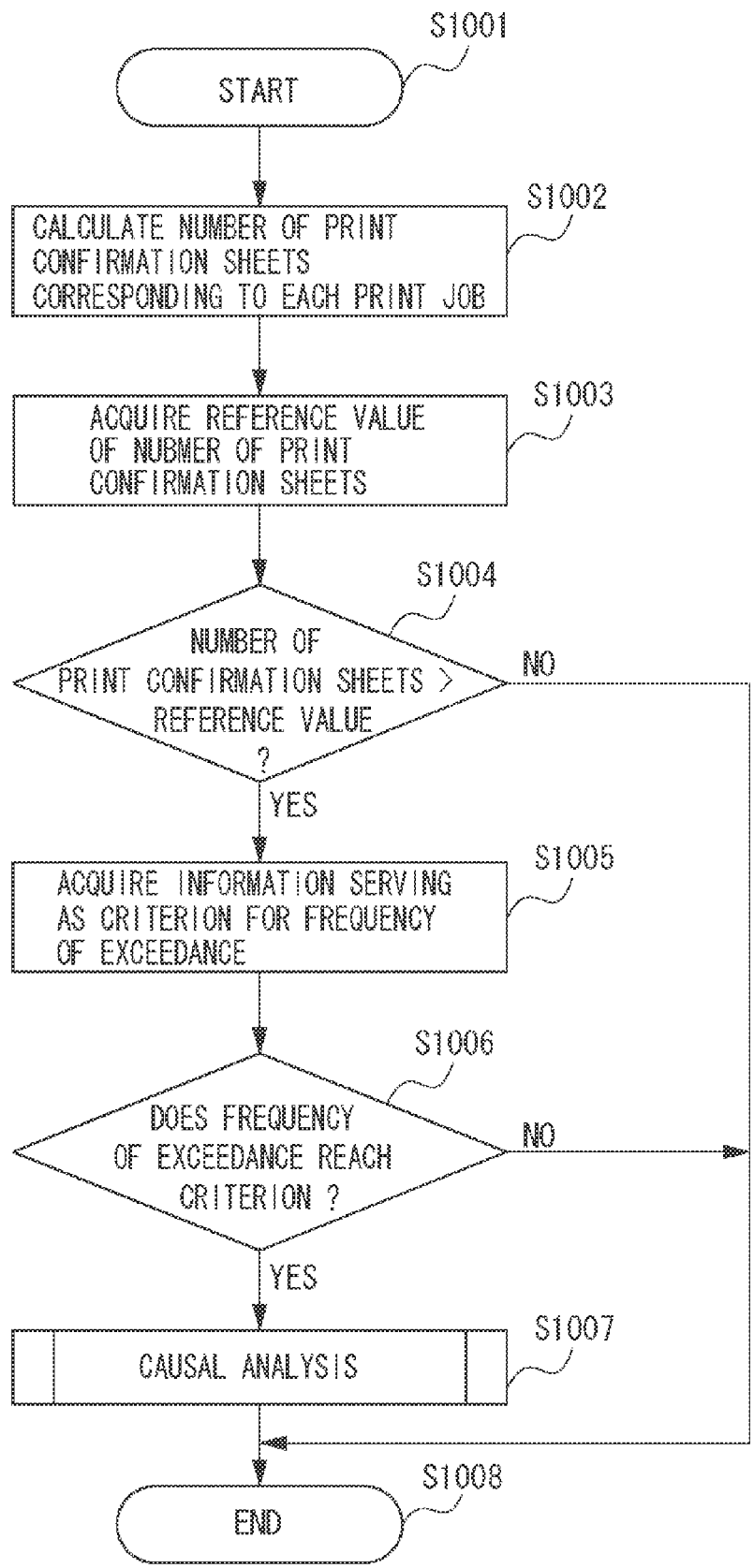
FIG. 6 is a flowchart illustrating a sequence of processing in which the management apparatus determines whether exceedance of the number of printed confirmation sheets from a reference value frequently occurs, and performs analysis of causes of frequent occurrence of the exceedance.

FIG. 6 is a flowchart illustrating a sequence of processing in which the management apparatus 20 determines whether the exceedance of the number of printed confirmation sheets from the reference value frequently occurs and analyzes a cause of frequent occurrence of the exceedance. The processing is implemented by reading programs for performing the processing to a predetermined storage region of the management apparatus 20, and executing the program with the CPU 201, so that the modules illustrated in FIG. 3B are operated.

In step S1001, the processing is started. In step S1002, the management apparatus 20 calculates the number of printed confirmation sheets corresponding to each print job. Step S1002 corresponds to the above described step 1.

In step S1003, the analysis unit 211 of the management apparatus 20 acquires the reference value (first threshold) of the number of printed confirmation sheets from the storage unit 212. The management apparatus 20 provides an interface illustrated in FIG. 5. Thus, an administrator of a printing company can register the reference value of the number of printed confirmation sheets. In step S1004, the analysis unit 211 determines whether the number of printed confirmation sheets exceeds the reference value (i.e., the analysis unit 211 performs first analysis). Steps S1003 and S1004 correspond to the above described step 2. If it is determined that the number of printed confirmation sheets corresponding to a certain print job exceeds the reference value (YES in step S1004), the processing proceeds to step S1005. If it is determined that the number of printed confirmation sheets corresponding to a certain print job does not exceed the reference value (NO in step S1004), the processing proceeds to step S1008. Thus, the analysis unit 211 ends the processing.

In step S1005, the analysis unit 211 acquires, from the storage unit 212, information (second threshold) serving as a criterion for determining whether exceedance of the number of printed confirmation sheets from the reference value frequently occurs. Then, in step S1006, the analysis unit 211 determines whether a frequency of the exceedance of the number of printed confirmation sheets from a reference value reaches the criterion (i.e., the analysis unit 211 performs second analysis). step S1006 corresponds to the above described step 3. If it is determined that the frequency of the exceedance reaches the criterion (YES in step S1006), the processing proceeds to step S1007. If it is determined that the frequency of the exceedance does not reach the criterion (NO in step S1006), the processing proceeds to step S1008. Thus, the analysis unit 211 ends the processing.

In step S1007, the analysis unit 211 analyzes probability of occurrence of an abnormality considered as a cause of the frequent occurrence of the exceedance of the number of printed confirmation sheets from the reference value in the printing apparatus 10 (i.e., the analysis unit 211 performs third analysis). A result of the causal analysis is accumulated in the storage unit 212. step S1007 corresponds to the above described step 4 and is described in detail below. Then, the analysis unit 211 advances the processing to step S1008 and ends the processing.

A practical example of the causal analysis (step 4) is described with reference to FIGS. 7A through 7D and FIG. 8.

In the above described step 4, when the exceedance of the number of printed confirmation sheets from the reference value frequently occurs, the management apparatus 20 analyzes the probability of occurrence of an abnormality in the printing apparatus 10. The management apparatus 20 performs the following causal analyses using the number of printed sheets, status information, and history information collected from the printing apparatus 10. Hereinafter, four examples of the causal analyses are particularly described. The causal analyses described below may be performed in parallel with one another. Accordingly, quality of maintenance of the printing apparatus 10 can be improved.

FIGS. 7A through 7D are flowcharts illustrating the examples of processing for analyzing, executed by the management apparatus 20, a cause of the frequent occurrence of the exceedance of the reference value of the number of printed confirmation sheets from the reference value.

Figure 7A:
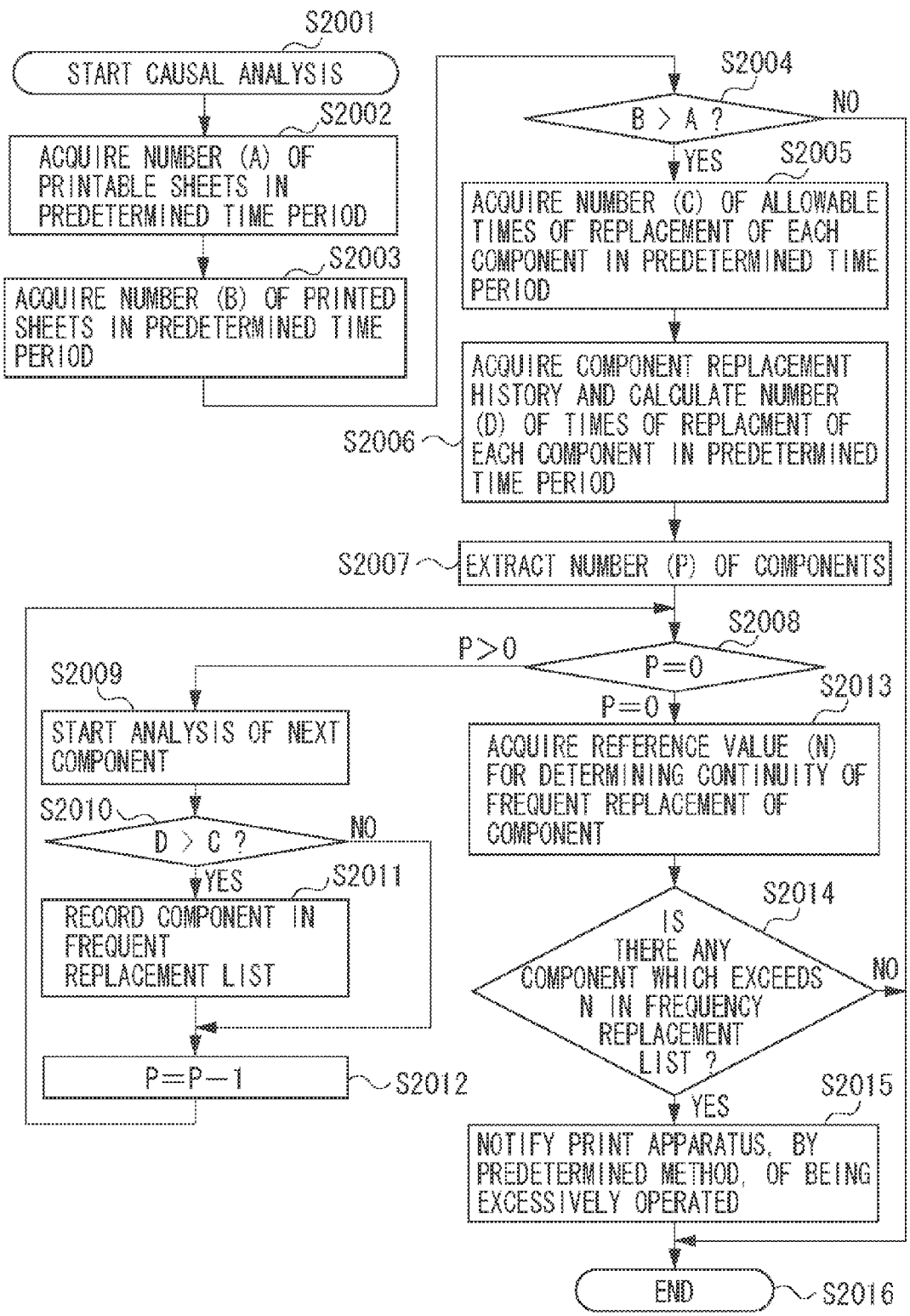

FIG. 7A illustrates processing for analyzing a history of replacement of components of the printing apparatus 10. For example, when a large amount of sheets is printed excessively and continuously, wear and tear on components increases, so that component replacement frequently occurs. After the component replacement, an operator performs a comparison in hue between a printed output before and after the component replacement, and so on. Accordingly, if the component replacement is frequently performed, the number of printed confirmation sheets may increase. Based on such an analysis, it is considered to suggest a method for appropriately utilizing the printing apparatus 10. The suggestion of the method for appropriately utilizing the printing apparatus 10 includes not only that of how to use the printing apparatus 10 but also proposals to replace the printing apparatus 10 with a printing apparatus of another model and to perform distributed printing in cooperation with another printing apparatus.

Instep S2001, the management apparatus 20 starts the causal analysis. In step S2002, the analysis unit 211 acquires, from the storage unit 212, an allowable number A of sheets printed in a predetermined time period which is used as a determination criterion for analysis in the processing. In step S2003, the analysis unit 211 acquires, from the storage unit 212, the number B of sheets printed in an actual predetermined time period. The allowable number A of printed sheets is set at a value which depends upon specifications of the printing apparatus 10 and allows the printing apparatus 10 to operate without trouble. For example, a recommended value can be used as the value of the allowable number A of printed sheets. The number B of sheets actually printed is calculated based on information stored at a timing when this analysis is performed, by storing a total number of printed sheets each time when the information is collected from the printing apparatus.

In step S2004, the analysis unit 211 determines whether the number B of sheets printed in the predetermined time period is larger than the allowable number A of sheets printed in the predetermined time period. If it is determined that the number B is larger than the number A (YES in step S2004), the processing proceeds to step S2005. If it is determined that the number B is smaller than the number A (NO in step S2004), the processing proceeds to step S2016. Thus, the analysis unit 211 ends the analysis processing.

In step S2005, the analysis unit 211 acquires an allowable number C of times of replacement of each component in a predetermined time period. In step S2006, the analysis unit 211 acquires, from the storage unit 212, history information about replacement of components of the printing apparatus 10 and calculates the number D of replacement of each component in a predetermined time period. The allowable number C of times of replacement of each component in the predetermined time period is preliminarily set at a target value based on the number of times of component replacement performed when the printing apparatus is normally used.

In step S2007, the analysis unit 211 acquires the number P of components of the printing apparatus 10 from the storage unit 212. Then, in the processing subsequent to step S2008 (i.e., in steps S2009 through S2012), the analysis unit 211 analyzes whether an abnormality occurs in the number of times of component replacement. More specifically, in step S2010, the analysis unit 211 determines whether there is any component whose number D of times of actual replacement is larger than the allowable number C of times of component replacement among P pieces of components. In step S2011, the component whose number D is larger than the allowable number C is recorded in a frequent replacement list. If a component has been consecutively recorded in the frequent replacement list from past analyses, the number of the consecutive analyses is recorded in the frequent replacement list associated with the component.

In step S2008, after the analysis of whether an abnormality occurs in the number of times of component replacement is completed on all components of the printing apparatus 10 (P=0 in step S2008), the processing proceeds to step S2013. In step S2013, the analysis unit 211 acquires, from the storage unit 212, a reference value N for determining whether the frequent occurrence of component replacement is continuous. In step S2014, the analysis unit 211 determines whether there is any component which exceeds the reference value N in the number of times of consecutively being recorded in the frequency replacement list, among the components recorded in the frequency replacement list. If there is a component that exceeds the reference value N in the number of times of consecutively being recorded in the frequency replacement list (YES in step S2014), the processing proceeds to step S2015. If there is no component that exceeds the reference value N in the number of times of consecutively being recorded in the frequency replacement list (NO in step S2014), the processing proceeds to step S2016. Thus, the analysis unit 211 ends the analysis processing.

In step S2015, the analysis unit 211 notifies that the printing apparatus 10 is excessively operated by a predetermined notification method. The contents of a notification are extracted from the storage unit 212 and include a proposal to improve a state in which the printing apparatus 10 is excessively operated. In step S2016, the analysis unit 211 ends the analysis processing.

Figure 7B:
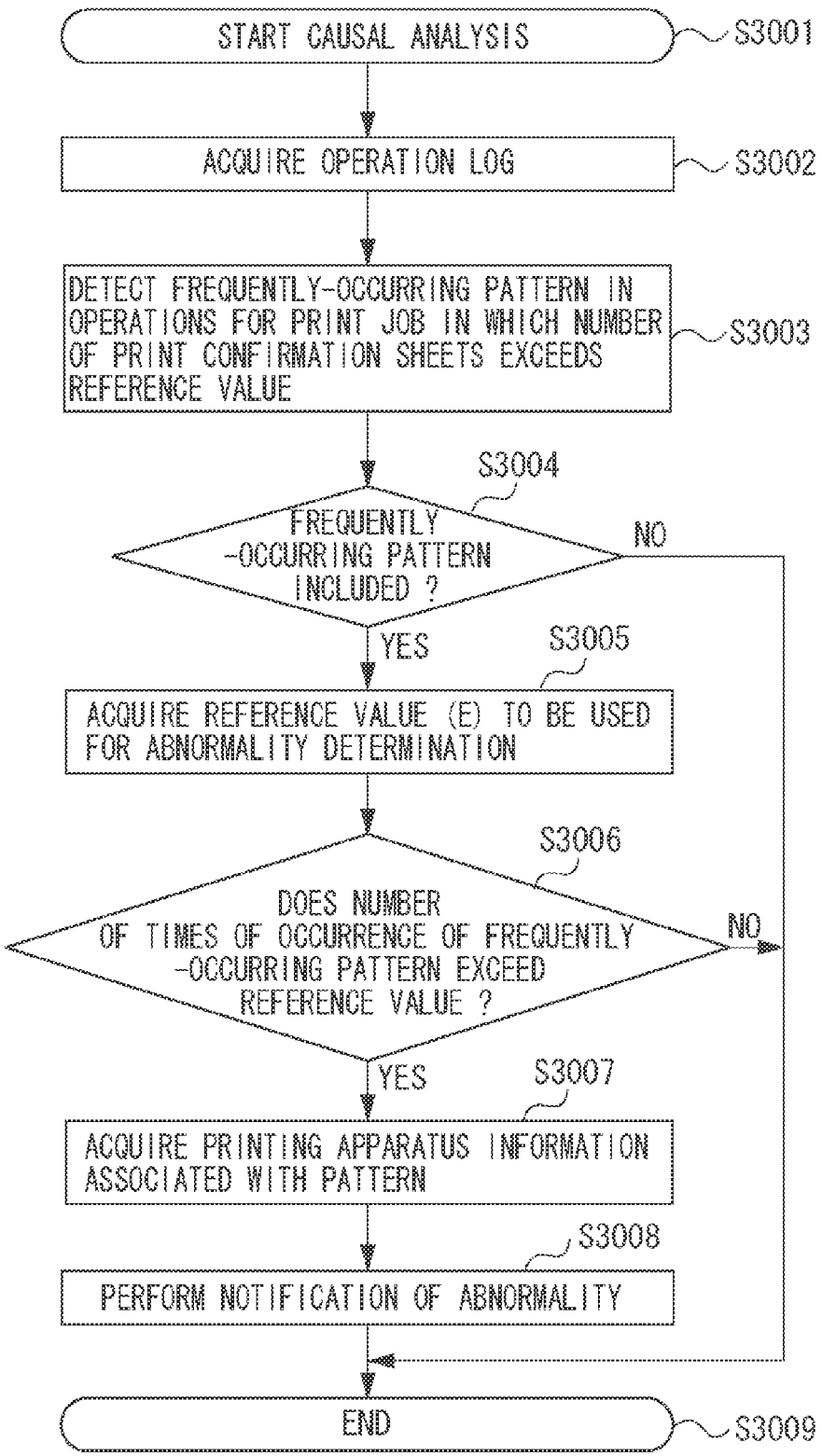

In the processing illustrated in FIG. 7B, an operator performs operations, such as adjustment of the hue, on the printing apparatus 10 from the operation unit 101. The analysis unit 211 analyzes whether it is difficult to achieve desired adjustment. In this case, the operator continues to cause the printing apparatus 10 to perform confirmation printing until desired adjustment is achieved. Consequently, the number of printed confirmation sheets becomes large. In this analysis processing, the analysis unit 211 analyzes operation logs (i.e., history information about operations performed by the operator) collected from the printing apparatus 10. Further, the analysis unit 211 finds out common points thereamong and extracts an operation pattern that can be associated with an abnormality which may be occurred in the printing apparatus 10. If a frequency of extraction of the operation pattern is high, the analysis unit 211 determines that an abnormality occurs in the printing apparatus 10. A more specific case is that when an operation pattern of repeating adjustment of density unevenness is detected many times, it is highly likely that an abnormality such as a malfunction may occur in a member associated with density control. In this case, the analysis unit 211 extracts the member concerned and instructs an operator to inspect the extracted member. The member of the printing apparatus 10 which is associated with density control is, e.g., a density sensor and a voltage control unit (not shown) for controlling a development bias.

In step S3001, the analysis unit 211 starts causal analysis processing. In step S3002, the analysis unit 211 acquires, from the storage unit 212, operation log information in the printing apparatus 10. The operation log information includes operation logs accumulated in the printing apparatus 10. In step S3003, the analysis unit 211 detects a frequently-occurring pattern from logs of operations performed by an operator on a print job which is determined in step S1004 illustrated in FIG. 6 that the number of printed confirmation sheets exceeds the reference value. The frequently-occurring pattern is applied to particularly highly frequent operations, continuously repeated operations, and so on. In step S3004, the analysis unit 211 determines, based on a result of the detection, whether the frequently-occurring pattern is included in the operation log information. If the frequently-occurring pattern is included in the operation log information (YES in step S3004), the processing proceeds to step S3005. If the frequently-occurring pattern is not included in the operation log information (NO in step S3004), the processing proceeds to step S3009. Thus, the analysis unit 211 ends the analysis processing.

In step S3005, the analysis unit 211 acquires, from the storage unit 212, a value (E) serving as a determination criterion to be used for determining an abnormality which is preliminarily determined corresponding to each pattern (operation content). Such values (E) are preliminarily determined, based on how much each operation is performed in a utilization form usually assumed in each printing apparatus. In step S3006, the analysis unit 211 determines whether a frequency of occurrence of the frequent-occurring pattern detected in step S3003 or the number of times of consecutive occurrences of such a pattern exceeds the reference value (E) of the printing apparatus 10. If the frequency or the number exceeds the reference value (E), the processing proceeds to step S3007. If the frequency or the number does not exceed the reference value (E), the processing proceeds to step S3009. Thus, the analysis unit 211 ends the analysis processing.

In step S3007, the analysis unit 211 acquires, from the storage unit 212, printing apparatus information associated with the pattern (operation content) determined in step S3006 to exceed the determination criterion (E). The printing apparatus information associated with the operation content includes information about a member of the printing apparatus, the setting and the adjustment of which are performed by the operation. In step S3008, the analysis unit 211 notifies an operator via the communication unit 205 of the abnormality of the printing apparatus 10 by a predetermined communication method. If an adjustment operation associated with the density is determined as a pattern which exceeds the determination criterion, the analysis unit 211 extracts associated components, such as a density sensor, and notifies information which promotes an operator to inspect such components. Then in step S3009, the analysis unit 211 ends the analysis processing.

The analysis unit 211 acquires information about the operator who performs the operation from the operation log corresponding to the pattern which is determined to exceed the determination criterion in step S3006. The analysis unit 211 can further determine whether a plurality of operators repeatedly perform similar operation patterns in the analysis processing up to the last time. If the plurality of operators repeatedly perform similar operation patterns, it is found that the operations are performed independent of the operators' levels of proficiency. It can be analyzed that an abnormality of the apparatus itself occurs with high probability. In such a case, in step S3008, the analysis unit 211 notifies that an abnormality with a higher degree of importance occurs or that it is very likely an abnormality.

FIG. 7C is a flowchart illustrating processing for analyzing a frequency of occurrence of a state in which a correction range of calibration of the printing apparatus 10 is larger than an assumed value. When the frequency increases, the analysis unit 211 determines that an abnormality occurs in the printing apparatus 10. The analysis unit 211 assists reduction in the number of printed confirmation sheets by extracting information for eliminating the abnormality. In this processing, the analysis unit 211 analyzes appropriate settings when it is considered that an abnormality is caused by the use of the printing apparatus 10 and that an operator cannot select appropriate setting for the printing apparatus 10 which stores a plurality of types of calibration setting information.

In step S4001, the analysis unit 211 starts causal analysis processing. In step S4002, the analysis unit 211 acquires, from the storage unit 212, actual performance information about calibration collected from the printing apparatus 10. In step S4003, the analysis unit 211 collates a print job which is determined in step S1004 illustrated in FIG. 6 that the number of printed confirmation sheets exceeds the reference value, with the actual performance information about the calibration and determines whether calibration has been performed. If calibration has been performed (YES in step S4003), the processing proceeds to step S4004. If calibration has not been performed (NO in step S4003), the processing proceeds to step S4010. Thus, the analysis unit 212 ends the processing.

In step S4004, the analysis unit 211 acquires, from the storage unit 212, a reference value (F) for allowable correction corresponding to each parameter in calibration. In step S4005, the analysis unit 211 determines whether a correction range according to the actual performance information about calibration which is acquired in step S4002 exceeds the reference value (F). If the correction range in the calibration exceeds the reference value (F) (YES in step S4005), the processing proceeds to step S4006. If the correction range does not exceed the reference value (F) (NO in step S4005), the processing proceeds to step S4010. Thus, the analysis unit 211 ends the processing.

In step S4006, the analysis unit 211 acquires, from the storage unit 211, a determination criterion value (G) for determining whether the frequency of occurrence of calibration correction which exceeds the reference value (F) is abnormal. The determination criterion value (G) serves as a criterion for determining whether when the number of times of calibration correction which exceeds the reference value (F) is performed in a predetermined time period or within a predetermined number of printed sheets, the number of times of calibration correction is an abnormal number which cannot be ordinarily assumed. In step S4007, the analysis unit 211 determines, based on the determination criterion value (G), whether exceedance of the correction range of calibration from the reference value frequently occurs. If the exceedance of the correction range of calibration from the reference value frequently occurs (YES in step S4007), the processing proceeds to step S4008. If the exceedance of the correction range of calibration from the reference value does not frequently occur (NO in step S4007), the processing proceeds to step S4010. Thus, the analysis unit 211 ends the processing.

In step S4008, the analysis unit 211 acquires, from the storage unit 212, the printing apparatus information associated with a parameter in calibration so far determined to be subjected to the abnormal correction. The printing apparatus information concerning a method for selecting calibration setting includes information for correcting a state in which non-optimal calibration setting is frequently selected. In addition, information about a schedule for performing calibration can be considered as the printing apparatus information. The analysis unit 211 also acquires information for promoting correction of a state in which calibration is not frequently executed. In step S4009, the analysis unit 211 notifies an operator, via the communication unit 205, of occurrence of an abnormality in the printing apparatus 10 and a method for coping with the abnormality. Then, in step S4010, the analysis unit 211 ends the processing.

Figure 7D:
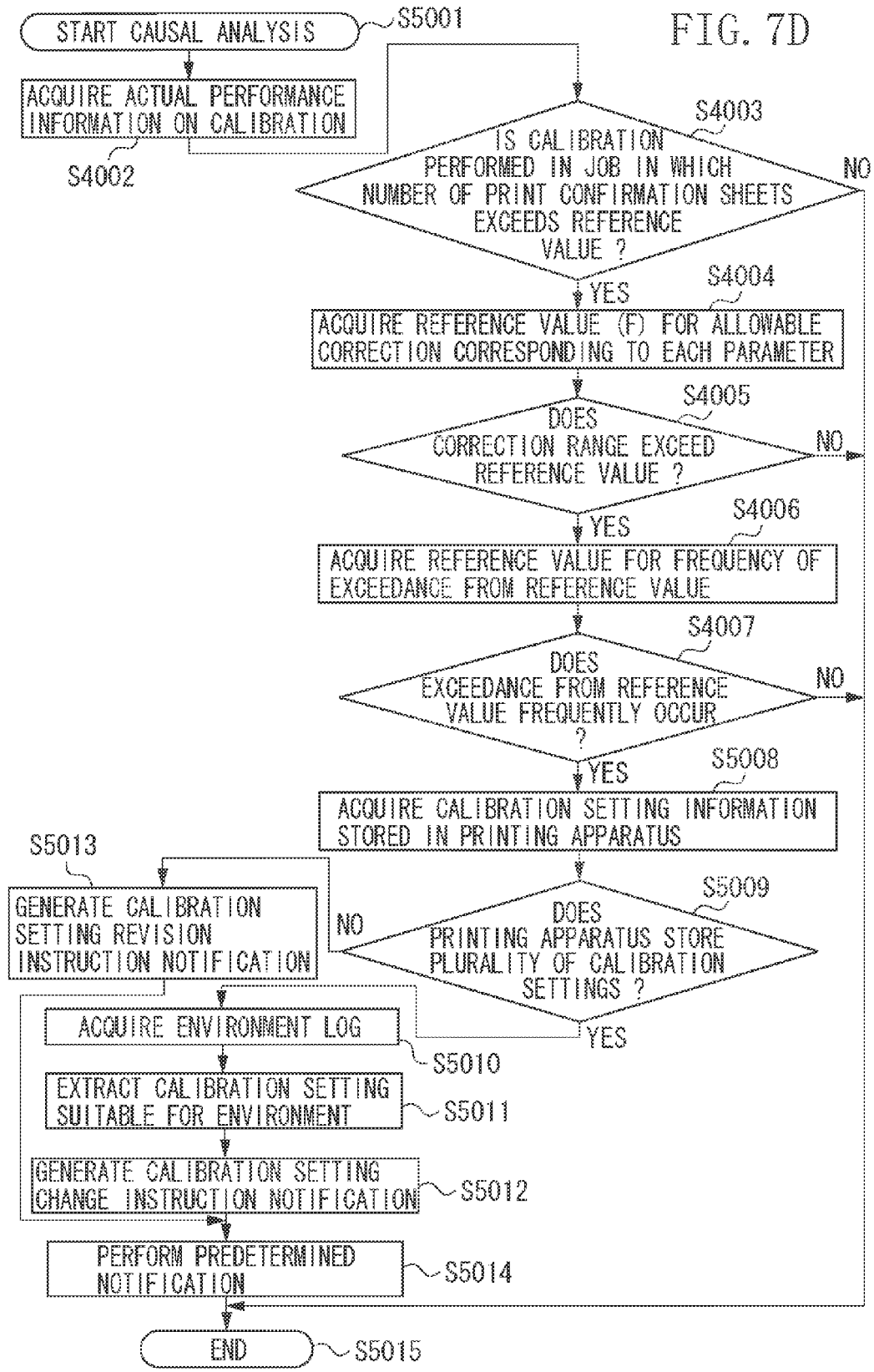

Being similar to FIG. 7C, FIG. 7D is a flowchart illustrating processing for analyzing when a frequency of occurrence of a state in which a correction range of calibration of the printing apparatus 10 is larger than an assumed value. The processing illustrated in FIGS. 7C and 7D overlap with each other in steps S4002 through 54007, thus, description thereof is omitted. In this processing, when a color deviation amount obtained by calibration is large, the analysis unit 211 determines that abnormalities very likely occur at parts of the printing apparatus 10 which are associated with a set value of the color deviation amount. If the color deviation amount is largely deviated from an amount ordinarily assumed, information about a member associated with measurement of the color deviation amount, e.g., optical components, such as a lens, and a color deviation amount measurement sensor is extracted as information about a member which causes an abnormality.

In step S5001, the analysis unit 211 starts causal analysis processing. In steps S4002 through S4007, processing similar to that illustrated in FIG. 7C is performed.

In step S5008, the analysis unit 211 acquires, from the storage unit 212, information concerning the calibration setting received from the printing apparatus 10. In step S5009, the analysis unit 211 determines whether the printing apparatus 10 stores a plurality of types of calibration settings. If the printing apparatus 10 stores a plurality of types of calibration settings (YES in step S5009), the processing proceeds to step S5010. If the printing apparatus 10 does not store a plurality of types of calibration settings (NO in step S5009), the processing proceeds to step S5013.

In step S5010, the analysis unit 211 acquires, from the storage unit 212, environment log information collected from the printing apparatus 10. Environment logs included by the environment log information record environmental information such as an electric current and a voltage measured at a component of the printing apparatus 10 in addition to a temperature and a humidity of an inside or an outside thereof. In step S5011, the analysis unit 211 extracts the calibration setting suitable for environmental information of the printing apparatus 10. In step S5012, the analysis unit 211 generates notification information including an instruction to change the calibration setting. If it is determined that the printing apparatus 10 does not store a plurality of types of calibration settings (NO in step S5009), in step S5013, the analysis unit 211 generates notification information including an instruction to revise the calibration setting. In this case, an appropriate revision method can be analyzed in consideration of the environment log and included in the notification information.

In step S5014, the analysis unit 211 notifies an operator of the notification information generated in steps S5012 and S5013, via the communication unit 205. Then, in step S5015, the analysis unit 211 ends the processing.

In the above described step 5, the management apparatus 20 notifies a predetermined destination of an analysis result, via the communication unit 205. The notification is performed at a timing of performing each of steps S2015, S3008, S4009, and S5014 respectively illustrated in FIGS. 7A, 7B, 7C, and 7D. Portable terminals 50 which an operator and a serviceperson have are designated as notification targets. The analysis result may be notified by e-mail or the like. The management apparatus 20 can notify the printing apparatus 10 of the analysis result.

FIG. 8 illustrates an example of a notification of the analysis result received from the management apparatus 20 displayed on a display panel of the printing apparatus 10. Here, an example of an analysis result acquired by the analysis illustrated in FIG. 7A is described.

When a notification from the management apparatus 20 is received via the communication unit 107, the printing apparatus 10 causes the storage unit 122 to store notified information. The notified information is displayed on a panel 501 of the operation unit 101 of the printing apparatus 10 at a timing when an operator logs on the printing apparatus 10 or when printing is completed. Contents of the notification are displayed in a notification content display unit 502. The displayed contents include a phenomenon occurring in the printing apparatus 10, information concerning analysis performed the management apparatus 20, and a method for coping with an abnormality. FIG. 8 illustrates a message that printing whose printing amount is larger than performance assumed by specs of the printing apparatus 10 is performed. The message also proposes that this problem is coped with by performing distributed printing. FIG. 8 also illustrates other printing apparatuses which are provided in the same environment as that of the printing apparatus 10 and determined as suitable for distributed printing by the management apparatus 20 with an order of suitability. This order is determined by considering that other printing apparatuses have functions equivalent to those of the printing apparatus 10, that no abnormality is confirmed in other printing apparatuses, and that there is a free-time in a printing schedule. When an operator puts the panel 501 into a normal display state, a "return" button 503 is pressed.

FIG. 8 illustrates an example of automatically displaying, on a panel of the printing apparatus 10, an analysis result received from the management apparatus 20 and operation support information for coping with an abnormality. The operation support information includes a proposition operation and an operation procedure. When a setting instruction is transmitted from the management apparatus 20 to the printing apparatus 10, the printing apparatus 10 can perform an operation of automatically updating the setting thereof, an operation of displaying a screen on which an operator can select and designate one of a plurality of types of setting, which are employed as candidates, and the like.

When an abnormality of the printing apparatus 10 cannot be detected which serves as a cause of increase of the number of printed confirmation sheets as in the above four examples of analysis illustrated in FIGS. 7A through 7D, the analysis unit 211 performs the following processing.

For example, the analysis unit 211 acquires, from the storage unit 212, an abnormality list of statistically large abnormalities of printing apparatuses that are of the same model as that of the printing apparatus 10 in the past abnormality detection results. In the abnormality list of the printing apparatus, events occurring in other printing apparatuses and a method for coping with the abnormalities, which has actually eliminated the abnormalities, are described. Characteristic symptoms of the printing apparatuses of the same model are extracted and notified. Thus, the processing assists elimination of the abnormalities of the printing apparatuses. Alternatively, when abnormalities of printing apparatuses cannot be detected, the analysis unit 211 may generate detail information about analysis performed on the printing apparatus 10 and notifies an operator of the generated detail information.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-098146 filed Apr. 14, 2009, which is hereby incorporated by reference herein in its entirety.

What is claimed is:

1. A management apparatus which manages a printing apparatus, comprising:

a first acquisition unit configured to acquire a number of sheets to be printed included in a print request from a client;

a second acquisition unit configured to acquire an actual performance number of sheets printed out based on history information of one job corresponding to the print request from the printing apparatus;

a calculation unit configured to calculate a number of printed confirmation sheets of the one job by subtracting the acquired number of sheets to be printed by the first acquisition unit from the acquired actual performance number by the second acquisition unit;

a first analyzing unit configured to analyze, corresponding to each of a plurality of jobs processed by the printing apparatus, whether the number of printed confirmation sheets exceeds a first threshold;

a second analyzing unit configured to analyze that the job, which is analyzed that the number of printed confirmation sheets exceeds the first threshold, frequently occurs when the number of the jobs exceeds a second threshold in a preset time period; and a third analyzing unit configured to analyze, by using history information about replacement of components of the printing apparatus, history information about operations performed by an operator, and actual performance information of calibration from the printing apparatus, an abnormality of the printing apparatus when the second analyzing unit analyzes that the job frequently occurs, wherein the number of printed confirmation sheets is a number of sheets printed for at least one of a confirming adjustment of a hue to a customer's favorite, a confirming adjustment of a printing position and a continuous test printing to cause the printing apparatus to stably operate.

2. The management apparatus according to claim 1, wherein the third analyzing unit analyzes the abnormality based on the number of printed sheets which is acquired from history information of the plurality of jobs and on the history information about replacement of components of the printing apparatus.

3. The management apparatus according to claim 2, wherein, when the analyzed abnormality is an excessive operation, the third analyzing unit performs notification including information for promoting distributed printing as information about a method for coping with the abnormality.

4. The management apparatus according to claim 1, wherein the third analyzing unit perform to analyze the abnormality by determining whether a same operation performed on the job is repeated based on the history information about operations from the printing apparatus.

5. The management apparatus according to claim 4, wherein, when the analyzed abnormality is a malfunction of a member of the printing apparatus, the third analyzing unit performs notification including information for promoting inspection of the member as information about a method for coping with the abnormality.

6. The management apparatus according to claim 1, wherein the third analyzing unit analyzes the abnormality according to a correction range of calibration performed on the job based on the actual performance information of calibration from the printing apparatus.

7. The management apparatus according to claim 1, further comprising, a notification unit configured to perform, according to the analyzed abnormality, a notification including information about a coping method corresponding to contents of the abnormality.

8. A method performed by a processor in a printing apparatus, comprising:
obtaining a number of confirmation sheets printed out for confirmation printing in printing by the printing apparatus included in a print request from a client;
performing first analysis to analyze, corresponding to each of a plurality of jobs processed by the printing apparatus, whether the number of printed confirmation sheets exceeds a first threshold;
performing second analysis to analyze whether the job, which is analyzed that the number of printed confirmation sheets exceeds the first threshold, frequently occurs based on a result of determination using a second threshold; and
performing third analysis to analyze, by using history information about replacement of components of the printing apparatus, history information about operations performed by an operator, and actual performance information of calibration from the printing apparatus, an abnormality of the printing apparatus when the job, whose number of printed confirmation sheets exceeds the first threshold, is analyzed by the second analysis to frequently occur,
wherein the number of printed confirmation sheets is a number of sheets printed for at least one of a confirming adjustment of a hue to a customer's favorite, a confirming adjustment of a printing position and a continuous test printing to cause the printing apparatus to stably operate.

9. The method according to claim 8, wherein the performing to analyze the abnormality is based on the number of printed sheets which is acquired from history information of the plurality of jobs and on the history information about replacement of components of the printing apparatus.

10. The method according to claim 9, further comprising, when the analyzed abnormality is an excessive operation, performing notification including information for promoting distributed printing as information about a method for coping with the abnormality.

11. The method according to claim 8, wherein the performing to analyze the abnormality by determining whether a same operation performed on the job is repeated based on the history information about operations from the printing apparatus.

12. The method according to claim 11, further comprising, when the analyzed abnormality is a malfunction of a member of the printing apparatus, performing notification including information for promoting inspection of the member as information about a method for coping with the abnormality.

13. The method according to claim 8, wherein the performing to analyze the abnormality according to a correction range of calibration performed on the job based on the actual performance information of calibration from the printing apparatus.

14. The method according to claim 8, further comprising, performing, according to the analyzed abnormality, a notification including information about a coping method corresponding to contents of the abnormality.

15. A non-transitory computer-readable storage medium which stores a computer program for making a computer execute a method for managing a printing apparatus, the method comprising:
obtaining a number of confirmation sheets printed out for confirmation printing in printing by the printing apparatus included in a print request from a client;
performing first analysis to analyze, corresponding to each of a plurality of jobs processed by the printing apparatus, whether the number of printed confirmation sheets exceeds a first threshold;
performing second analysis to analyze whether the job, which is analyzed that the number of printed confirmation sheets exceeds the first threshold, frequently occurs based on a result of determination using a second threshold; and
performing third analysis to analyze, by using history information about replacement of components of the printing apparatus, history information about operations performed by an operator, and actual performance information of calibration from the printing apparatus, the abnormality when the job, whose number of printed confirmation sheets exceeds the first threshold, is analyzed by the second analysis to frequently occur,
wherein the number of printed confirmation sheets is a number of sheets printed for at least one of a confirming adjustment of a hue to a customer's favorite, a confirming adjustment of a printing position and a continuous test printing to cause the printing apparatus to stably operate.

16. The non-transitory computer-readable storage medium according to claim 15, wherein the performing to analyze the abnormality is based on the number of printed sheets which is acquired from history information of the plurality of jobs and on the history information about replacement of components of the printing apparatus.

17. The non-transitory computer-readable storage medium according to claim 16, further comprising, when the analyzed abnormality is an excessive operation, performing notification including information for promoting distributed printing as information about a method for coping with the abnormality.

18. The non-transitory computer-readable storage medium according to claim 15, wherein the performing to analyze the abnormality by determining whether a same operation performed on the job is repeated based on the history information about operations from the printing apparatus.

19. The non-transitory computer-readable storage medium according to claim 18, further comprises, when the analyzed abnormality is a malfunction of a member of the printing apparatus, performing notification including information for promoting inspection of the member as information about a method for coping with the abnormality.

20. The non-transitory computer-readable storage medium according to claim 15, wherein the performing to analyze the abnormality according to a correction range of calibration performed on the job based on the actual performance information of calibration from the printing apparatus.

* * * * *